US009654015B2

(12) United States Patent
Kidera et al.

(10) Patent No.: US 9,654,015 B2
(45) Date of Patent: May 16, 2017

(54) BIDIRECTIONAL DC/DC CONVERTER, AND BIDIRECTIONAL POWER CONVERTER

(71) Applicant: Panasonic Intellectual Property Management Co., Ltd., Osaka (JP)

(72) Inventors: Kazunori Kidera, Osaka (JP); Jin Yoshizawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/899,808

(22) PCT Filed: Jul. 1, 2014

(86) PCT No.: PCT/JP2014/003482
§ 371 (c)(1),
(2) Date: Dec. 18, 2015

(87) PCT Pub. No.: WO2015/001792
PCT Pub. Date: Jan. 8, 2015

(65) Prior Publication Data
US 2016/0149502 A1    May 26, 2016

(30) Foreign Application Priority Data
Jul. 2, 2013  (JP) .................... 2013-139122

(51) Int. Cl.
*H02M 3/335*   (2006.01)
*H02M 7/797*   (2006.01)
*H02M 7/487*   (2007.01)

(52) U.S. Cl.
CPC ... *H02M 3/33546* (2013.01); *H02M 3/33584* (2013.01); *H02M 7/797* (2013.01); *H02M 7/487* (2013.01)

(58) Field of Classification Search
CPC ............. H02M 3/33546; H02M 3/33584
(Continued)

(56) References Cited

U.S. PATENT DOCUMENTS 4,855,888 A * 8/1989 Henze ................ H02M 1/44
                                                363/132
8,759,582 B2 * 6/2014 Muddasani ........... C07C 237/22
                                                564/158
(Continued)

FOREIGN PATENT DOCUMENTS

JP    2001-037226 A    2/2001
JP    2009-33800 A     2/2009
(Continued)

OTHER PUBLICATIONS

International Search Report for corresponding International Application No. PCT/JP2014/003482 mailed Sep. 22, 2014.
(Continued)

*Primary Examiner* — Adolf Berhane
*Assistant Examiner* — Nusrat Quddus
(74) *Attorney, Agent, or Firm* — Renner, Otto, Boisselle & Sklar, LLP

(57) ABSTRACT

In a discharging operation of a vehicle storage battery, a controller switches between a full-wave rectification operation of full-wave rectify a voltage across a second winding while maintaining a second short circuit in an open state, and a full-wave voltage doubling rectification operation of full-wave voltage doubling rectify a voltage across second winding while maintaining second short circuit in a closed state, based on magnitude relationship between DC voltage across first terminals and DC voltage across second terminals. In a charging operation, controller switches between a full-wave rectification operation of full-wave rectify a voltage across a first winding while maintaining a first short circuit in an open state, and a full-wave voltage doubling rectification operation of full-wave voltage doubling rectify a voltage across first winding while maintaining first short circuit in a closed state, based on magnitude relationship
(Continued)

between DC voltage across first terminals and DC voltage across second terminals.

4 Claims, 3 Drawing Sheets

(58) Field of Classification Search
USPC .... 363/21.06, 21.12, 21.14, 21.1, 21.18, 40,
363/44, 45, 52, 53, 55, 56.01, 56.02, 84,
363/95, 96, 123, 125, 126, 127, 131, 132
See application file for complete search history.

(56) References Cited

U.S. PATENT DOCUMENTS

| | | | |
|---|---|---|---|
| 2009/0034300 A1 | 2/2009 | Ito et al. | |
| 2013/0106342 A1 | 5/2013 | Iwata et al. | |
| 2013/0128624 A1* | 5/2013 | Tamura | H02M 3/33569 363/21.01 |
| 2013/0140901 A1* | 6/2013 | Kidera | H01M 10/44 307/66 |
| 2013/0155741 A1* | 6/2013 | Takano | H02M 3/156 363/98 |
| 2013/0170252 A1* | 7/2013 | Nishino | H02M 1/08 363/21.02 |
| 2014/0268959 A1* | 9/2014 | Frohman | H02M 7/797 363/98 |
| 2014/0362626 A1* | 12/2014 | Kidera | H01L 27/0605 363/131 |
| 2015/0048810 A1* | 2/2015 | Terui | H02M 3/155 323/271 |
| 2015/0291044 A1* | 10/2015 | Adachi | H01M 10/48 320/134 |
| 2015/0295451 A1* | 10/2015 | Ogawa | H02J 7/35 307/66 |
| 2016/0009189 A1* | 1/2016 | Yoshizawa | B60L 3/04 307/9.1 |
| 2016/0072390 A1* | 3/2016 | Akutagawa | H02M 3/33584 363/17 |
| 2016/0087549 A1* | 3/2016 | Tamura | H02M 1/36 307/72 |
| 2016/0294290 A1* | 10/2016 | Tamura | H02M 1/08 |

FOREIGN PATENT DOCUMENTS

| | | |
|---|---|---|
| JP | 2009-177940 A | 8/2009 |
| JP | 2010-093952 A | 4/2010 |
| JP | 2010-252450 A | 11/2010 |
| JP | 2011-120370 A | 6/2011 |
| JP | 2013-99069 A | 5/2013 |

OTHER PUBLICATIONS

Form PCT/ISA/237 for corresponding International Application No. PCT/JP2014/003482 dated Sep. 22, 2014.

* cited by examiner

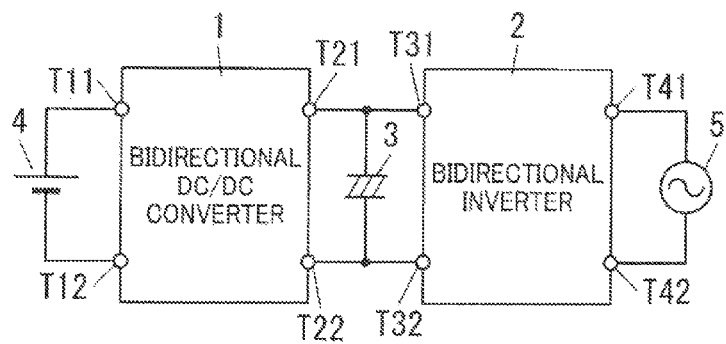
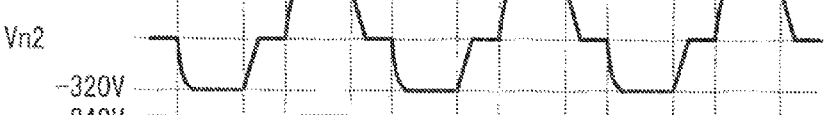
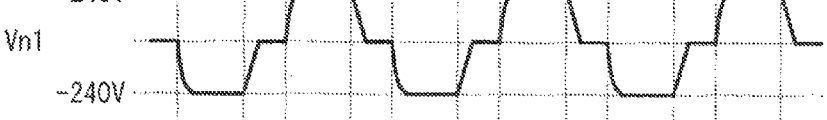

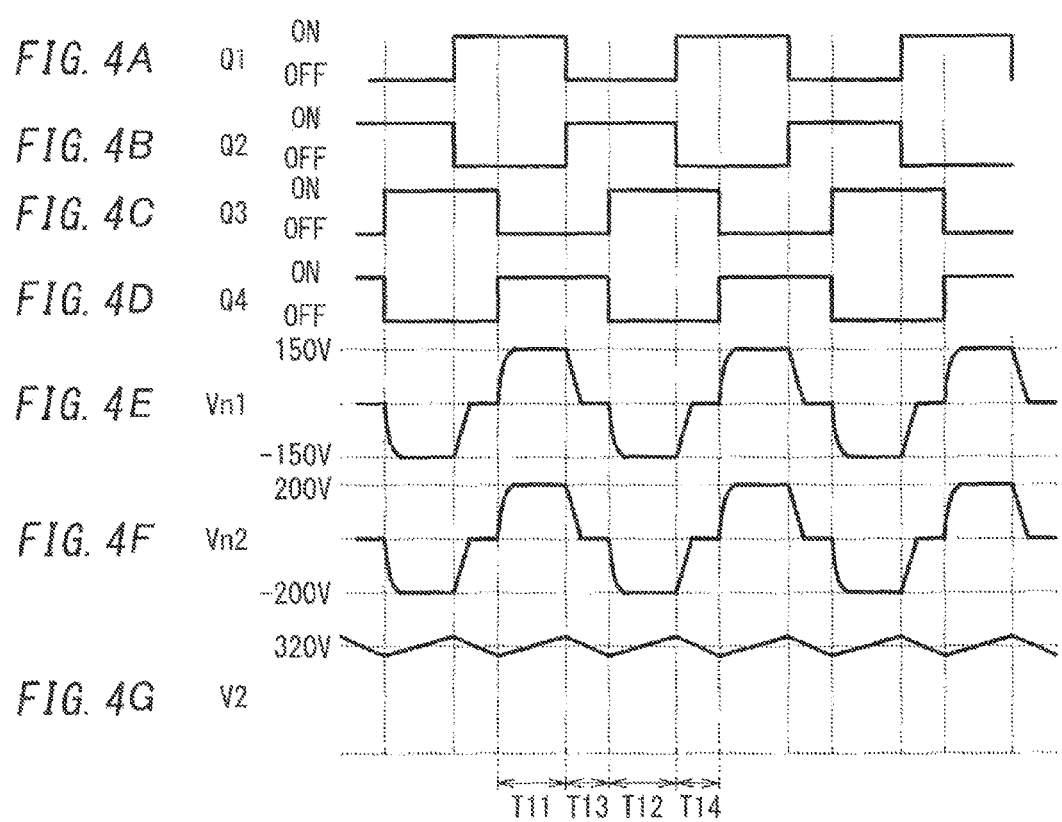

BIDIRECTIONAL DC/DC CONVERTER, AND BIDIRECTIONAL POWER CONVERTER

TECHNICAL FIELD

The invention relates generally to bidirectional DC/DC converters and bidirectional power converters and, more particularly, to a bidirectional DC/DC converter operating together with a bidirectional DC/AC inverter which is connected to a commercial power system and performs a linkage operation, and a bidirectional power converter including the bidirectional DC/DC converter.

BACKGROUND ART

In recent years, electric drive vehicles such as an electric vehicle (EV), a plug-in hybrid electric vehicle (PHEV) and the like become popular. Also, various kinds of power conditioners for a V2H (Vehicle to Home) system have been proposed for the purpose of using a vehicle storage battery equipped on the electric drive vehicle as a household power supply.

The power conditioner is generally constituted by a bidirectional DC/AC inverter (hereinafter, referred to as a bidirectional inverter) which is connected to the commercial power system and performs the linkage operation, and a bidirectional DC/DC converter to be connected to the vehicle storage battery equipped on the electric drive vehicle. The bidirectional DC/DC converter is required to have a function of electric power conversion from a battery voltage of the vehicle storage battery into a DC voltage required as an input of the bidirectional inverter, and a function of conversion from a DC voltage output from the bidirectional inverter into a charge voltage of the vehicle storage battery.

Conventionally, the bidirectional DC/DC converter includes a first conversion circuit including switching elements connected in a half-bridge manner and a voltage doubler rectifier circuit, and a second conversion circuit including switching elements connected in a full bridge manner. Power transfer between the first conversion circuit and the second conversion circuit is performed through a transformer, and the first conversion circuit and the second conversion circuit are electrically insulated by the transformer (for example, refer to JP 2011-120370 A).

The power conditioner for the V2H system is to be connected between the commercial power system and the electric drive vehicle, and controls charging and discharging operations between the vehicle storage battery and the commercial power system. The power conditioner is generally constituted by the bidirectional inverter which is to be connected to the commercial power system and performs the linkage operation, and the bidirectional DC/DC converter to be connected to the vehicle storage battery equipped on the electric drive vehicle.

The bidirectional DC/DC converter is required to have a function of performing electric power conversion from various battery voltages (DC150V to 450V) of the vehicle storage batteries into the DC voltages required as input of the bidirectional inverters in accordance with the battery voltage of a connected vehicle storage battery to be discharged. If a specification of an AC output of the bidirectional inverter is AC200V, the DC voltage required as an input of the bidirectional inverter is about DC300V to 400V. Also, if the specification of the AC output of the bidirectional inverter is AC 100V, the DC voltage required as an input of the bidirectional inverter is about DC 150V to 200V.

A voltage of the commercial power system to be connected to the bidirectional inverter is AC200V or AC100V. Accordingly, the bidirectional DC/DC converter is also required, for a charging operation of the vehicle storage battery, to have a function of performing electric power conversion from a DC voltage output from the bidirectional inverter connected to the commercial power system of AC200V or AC100V into any of the charge voltages of the vehicle storage batteries.

Accordingly, the bidirectional DC/DC converter is required to have a wide input voltage range and a wide output voltage range so as to be used for the various battery voltages of the vehicle storage batteries and various system voltages of the commercial power supplies. That is, such a bidirectional DC/DC converter is required that has a function of bidirectionally boosting and stepping down voltages in accordance with voltages selected from a wide range of battery voltages of vehicle storage batteries and a wide range of system voltages of commercial power supplies.

DISCLOSURE OF THE INVENTION

The invention is achieved in view of the above circumstances, and an object thereof is to provide a bidirectional DC/DC converter, which can bidirectionally boost and step down voltages with respect to wide ranges of an input voltage and an output voltage, and a bidirectional power converter.

A bidirectional DC/DC converter according to an aspect of the invention is configured to perform bidirectional voltage conversion in which an operation is switched between a first operation of outputting a second DC voltage resulting from DC/DC conversion of a first DC voltage received through first terminals, through second terminals, and a second operation of outputting a fourth DC voltage resulting from DC/DC conversion of a third DC voltage received through the second terminals, through the first terminals. The bidirectional DC/DC converter includes: a first switching circuit constituted by a series circuit of first and second switching elements connected between the first terminals and a series circuit of third and fourth switching elements connected between the first terminals; a first winding of a transformer connected between a connection point of the first and second switching elements and a connection point of the third and fourth switching elements; a second switching circuit constituted by a series circuit of fifth and sixth switching elements connected between the second terminals and a series circuit of seventh and eighth switching elements connected between the second terminals; a second winding of the transformer connected between a connection point of the fifth and sixth switching elements and a connection point of the seventh and eighth switching elements; first to eighth rectifying elements that are respectively connected in parallel to the first to eighth switching elements so that the first to eighth rectifying elements are reversely biased when receiving an input DC voltage; a series circuit of first and second capacitors connected between the first terminals; a series circuit of third and fourth capacitors connected between the second terminals; a first short circuit having a closed state of making electrical conduction between the connection point of the third and fourth switching elements and a connection point of the first and second capacitors and an open state of breaking the electrical conduction between the connection point of the third and fourth switching elements and the connection point of the first and second capacitors; a second short circuit having a closed state of making electrical conduction between the connection point of the seventh and eighth switching elements and a connection point of the third and fourth capacitors and an open state of breaking the electrical conduction between the connection point of the seventh and eighth switching elements and the connection point of the third and fourth capacitors; and a controller configured to perform drive controls of the first to eighth switching elements and open/close controls of the first and second short circuits. The controller is configured: in the first operation, to switch an operation between a full-wave rectification operation of applying a full-wave rectification voltage, resulting from full-wave rectification of a voltage across the second winding, to the series circuit of the third and fourth capacitors while maintaining the second short circuit in the open state, and a full-wave voltage doubling rectification operation of applying a voltage across the second winding alternately to the third capacitor and the fourth capacitor while maintaining the second short circuit in the closed state, on a basis of magnitude relationship between the first DC voltage received through the first terminals and the second DC voltage output through the second terminals; and in the second operation, to switch an operation between a full-wave rectification operation of applying a full-wave rectification voltage, resulting from full-wave rectification of a voltage across the first winding, to the series circuit of the first and second capacitors while maintaining the first short circuit in the open state, and a full-wave voltage doubling rectification operation of applying a voltage across the first winding alternately to the first capacitor and the second capacitor while maintaining the first short circuit in the closed state, on a basis of magnitude relationship between the fourth DC voltage output through the first terminals and the third DC voltage received through the second terminals.

A bidirectional power converter according to an aspect of the invention includes: the bidirectional DC/DC converter according to an aspect of the invention configured to perform bidirectional voltage conversion in which the operation is switched between the first operation of outputting the second DC voltage resulting from DC/DC conversion of the first DC voltage received through the first terminals, through the second terminals, and the second operation of outputting the fourth DC voltage resulting from DC/DC conversion of the third DC voltage received through the second terminals, through the first terminals; and a bidirectional inverter configured to convert the second DC voltage across the second terminals into an AC voltage and output the resultant AC voltage in accordance with the first operation, and to convert an AC voltage into the third DC voltage to apply the third DC voltage between the second terminals in accordance with the second operation.

BRIEF DESCRIPTION OF THE DRAWINGS

FIG. 2 is a block diagram illustrating a configuration of a bidirectional power converter of the Embodiment.

FIGS. 3A to 3G are waveform diagrams illustrating operations of each part in a charging operation of a vehicle storage battery according to the Embodiment.

FIGS. 4A to 4G are waveform diagrams illustrating operations of each part in a discharging operation of a vehicle storage battery according to the Embodiment.

DESCRIPTION OF EMBODIMENTS

Figure 1:
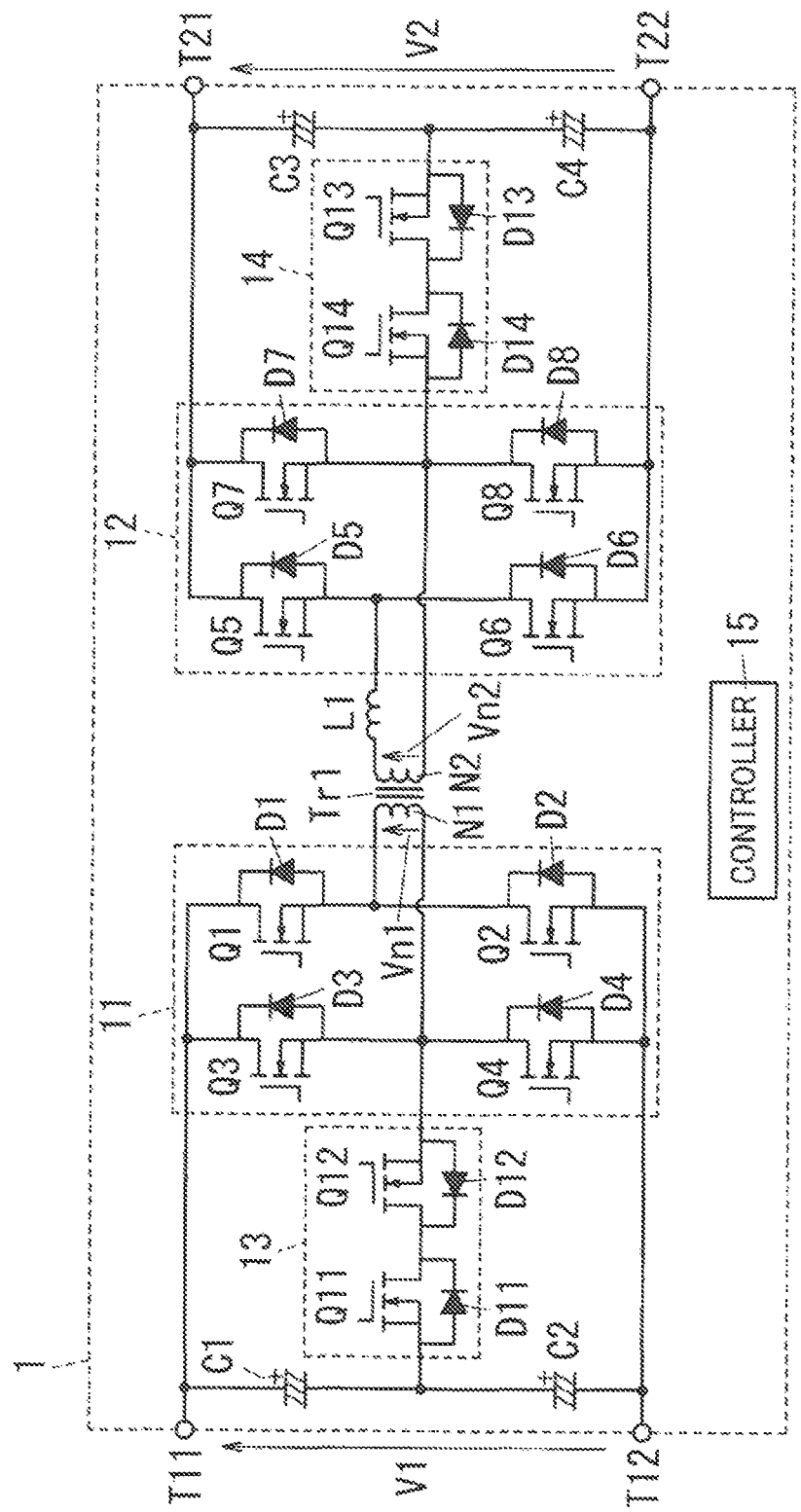
FIG. 1 is a circuit diagram illustrating a configuration of a bidirectional DC/DC converter of an Embodiment.

Hereinafter, an embodiment of the present invention will be described with reference to the drawings.

(Embodiment)

FIG. 2 shows a block diagram of a bidirectional power converter (power conditioner). The bidirectional power converter includes a bidirectional DC/DC converter 1, a bidirectional inverter 2 and a capacitor 3.

Regarding the bidirectional DC/DC converter 1, a vehicle storage battery 4 of an electric drive vehicle is connected between terminals T11 and T12 (first terminals), and the capacitor 3 is connected between terminals T21 and T22 (second terminals). Regarding the bidirectional inverter 2, the capacitor 3 is connected between terminals T31 and T32, and a commercial power system in which a commercial power is supplied from a commercial power supply 5 is connected between terminals T41 and T42.

In a discharging operation of the vehicle storage battery 4 (a first operation), the bidirectional DC/DC converter 1 converts a battery voltage of the vehicle storage battery 4 input through the terminals T11 and T12 into a desired DC voltage, and outputs the resultant DC voltage through the terminals T21 and T22. The DC voltage output through the terminals T21 and T22 is smoothed by the capacitor 3 and then, the resultant DC voltage is applied across the terminals T31 and T32 of the bidirectional inverter 2. The bidirectional inverter 2 converts the DC voltage input through the terminals T31 and T32 into an AC voltage compatible to the commercial power system, and outputs the resultant AC voltage through the terminals T41 and T42.

In a charging operation of the vehicle storage battery 4 (a second operation), the bidirectional inverter 2 converts a commercial voltage (AC voltage) input through the terminals T41 and T42 into a DC voltage, and outputs the resultant DC voltage through the terminals T31 and T32. The DC voltage output through the terminals T31 and T32 is smoothed by the capacitor 3 and then, the resultant DC voltage is applied across the terminals T21 and T22 of the bidirectional DC/DC converter 1. The bidirectional DC/DC converter 1 converts the DC voltage input through the terminals T21 and T22 into a charge voltage, and outputs the resultant voltage through the terminals T11 and T12 to charge the vehicle storage battery 4.

FIG. 1 shows a circuit configuration of the bidirectional DC/DC converter 1. The bidirectional DC/DC converter 1 includes switching circuits 11 and 12, a transformer Tr1, diodes D1 to D8, capacitors C1 to C4, short circuits 13 and 14, and a controller 15, as main elements.

The switching circuit 11 (a first switching circuit) includes a parallel circuit of switching elements Q1 and Q2 connected in series, and switching elements Q3 and Q4 connected in series. The parallel circuit is connected between the terminals T11 and T12. The switching elements Q1 and Q4 are positioned diagonally in a full-bridge, and the switching elements Q2 and Q3 are positioned diagonally in the full-bridge. Each of the switching elements Q1 to Q4 is constituted by a MOSFET (Metal-Oxide-Semiconductor Field-Effect Transistor) element. The switching elements Q1 to Q4 may be constituted by an IGBT (Insulated Gate Bipolar Transistor) element and the like, besides the MOSFET element. The switching elements Q1 to Q4 respectively correspond to first to fourth switching elements of an aspect of the present invention.

The diodes D1 to D4 (first to fourth rectifying elements) are respectively connected in inverse parallel to the switching elements Q1 to Q4.

A first winding N1 of the transformer Tr1 is connected between a connection point of the switching elements Q1 and Q2 and a connection point of the switching elements Q3 and Q4.

A series circuit of the capacitors C1 and C2 (first and second capacitors) is connected between the terminals T11 and T12. Capacitances of the capacitors C1 and C2 are the same.

The short circuit 13 (a first short circuit) is provided between the connection point of the switching elements Q3 and Q4 and a connection point of the capacitors C1 and C2 to have a closed state of making electrical conduction and an open state of breaking the electrical conduction between two connection points. The short circuit 13 is constituted by a series circuit of switching elements Q11 and Q12 connected between the connection point of the switching elements Q3 and Q4 and the connection point of the capacitors C1 and C2, and diodes D11 and D12 respectively connected in inverse parallel to the switching elements Q11 and Q12. Each of the switching elements Q11 and Q12 is constituted by the MOSFET element, the IGBT element and the like.

The switching circuit 12 (a second switching circuit) includes a parallel circuit of switching elements Q5 and Q6 connected in series, and switching elements Q7 and Q8 connected in series. The parallel circuit is connected between the terminals T21 and T22. The switching elements Q5 and Q8 are positioned diagonally in a full-bridge, and the switching elements Q6 and Q7 are positioned diagonally in the full-bridge. Each of the switching elements Q5 to Q8 is constituted by the MOSFET element, the IGBT element and the like. The switching elements Q5 to Q8 respectively correspond to fifth to eighth switching elements of an aspect of the present invention.

The diodes D5 to D8 (fifth to eighth rectifying elements) are respectively connected in inverse parallel to the switching elements Q5 to Q8.

A series circuit of a second winding N2 of the transformer Tr1 and an inductor L1 is connected between a connection point of the switching elements Q5 and Q6 and a connection point of the switching elements Q7 and Q8.

A series circuit of the capacitors C3 and C4 (third and fourth capacitors) is connected between the terminals T21 and T22. Capacitances of the capacitors C3 and C4 are the same.

The short circuit 14 (a second short circuit) is provided between the connection point of the switching elements Q7 and Q8 and a connection point of the capacitors C3 and C4 to have a closed state of making electrical conduction and an open state of breaking the electrical conduction between two connection points. The short circuit 14 is constituted by a series circuit of switching elements Q13 and Q14 connected between the connection point of the switching elements Q7 and Q8 and the connection point of the capacitors C3 and C4, and diodes D13 and D14 respectively connected in inverse parallel to the switching elements Q13 and Q14. Each of the switching elements Q13 and Q14 is constituted by the MOSFET element, the IGBT element and the like.

The controller 15 controls switching operations of the switching circuits 11 and 12 by controlling ON/OFF drives of the switching elements Q1 to Q8 on a basis of a voltage V1 between the terminals T11 and T12, a voltage V2 between the terminals T21 and T22 and a charge or discharge current of the vehicle storage battery 4. The controller 15 also controls open and close operations of the short circuits 13 and 14 by controlling ON/OFF drives of the switching elements Q11 to Q14. Note that in FIG. 1, control lines between the controller 15 and each of the switching elements Q1 to Q8 and the switching elements Q11 to Q14, a detector for the voltage V1 and the voltage V2, and a detector for the charge and discharge currents of the vehicle storage battery 4 are omitted.

According to the present embodiment, the controller 15 switches an operation between a full-wave rectification operation and a full-wave voltage doubling rectification operation by switching the closed state of making electrical conduction and the open state of breaking the electrical conduction, of the short circuits 13 and 14, on a basis of magnitude relationship between a DC voltage across the terminals T11 and T12 and a DC voltage across the terminals T21 and T22.

Hereinafter, an operation of the bidirectional DC/DC converter 1 will be described.

Charge voltage and discharge voltage of the vehicle storage battery 4 (the voltage V1 across the terminals T11 and T12) vary within a range of DC150V to 450V depending on specifications and states of the vehicle storage battery 4. A system voltage of the commercial power supply 5 is assumed to be AC200V, and a voltage across the capacitor 3 is assumed to be DC320V. In this case, a ratio in the number of turns of the windings N1, N2 of the transformer is set that the number of turns of the first winding N1: the number of turns of the second winding N2 is 3:4.

First explained is an operation for charging the vehicle storage battery 4 in a case where the charge voltage of the vehicle storage battery 4 is DC150V, with reference to waveform diagrams in FIGS. 3A to 3G. A voltage output from the bidirectional inverter 2 through the terminal T31 and T32 is DC320V. The bidirectional DC/DC converter 1 steps down a voltage V2 across the terminals T21 and T22 of DC320V (an input voltage) to a voltage V1 across the terminals T11 and T12 of DC150V (an output voltage).

In the charging operation of the vehicle storage battery 4 with a charge voltage of DC150V, as shown in FIGS. 3A to 3D, the controller 15 controls the switching operations of the switching elements Q5 to Q8 to perform a full bridge operation. In the full bridge operation of the switching circuit 12, the switching elements Q13 and Q14 are maintained in OFF states by the controller 15.

Duty cycles of the switching elements Q5 and Q6 are controlled to be approximately 50%, and ON/OFF states of the switching elements Q5 and Q6 are mutually inverted. That is, while the switching element Q5 is in an ON state, the switching element Q6 is in an OFF state. Also, while the switching element Q5 is in an OFF state, the switching element Q6 is in an ON state. A dead time in which the switching elements Q5 and Q6 are both in OFF states is provided when the ON/OFF states of the switching elements Q5 and Q6 are mutually inverted (not shown in FIGS. 3A and 3B).

Duty cycles of the switching elements Q7 and Q8 are controlled to be approximately 50%, and ON/OFF states of the switching elements Q7 and Q8 are mutually inverted. That is, while the switching element Q7 is in an ON state, the switching element Q8 is in an OFF state. Also, while the switching element Q7 is in an OFF state, the switching element Q8 is in an ON state. A dead time in which the switching elements Q7 and Q8 are both in OFF states is provided when the ON/OFF states of the switching elements Q7 and Q8 are mutually inverted (not shown in FIGS. 3C and 3D).

FIG. 3E shows a waveform of a voltage Vn2 of the second winding N2 of the transformer Tr1, and FIG. 3F shows a waveform of a voltage Vn1 of the first winding N1 of the transformer Tr1. In a period in which the switching elements Q5 and Q8 are both in the ON states and the switching elements Q6 and Q7 are both in the OFF states, a voltage Vn2 of 320V is applied across the second winding N2 of the transformer Tr1. In this period, a stepped down voltage Vn1 of 240V in accordance with a ratio in the number of turns of the transformer Tr1 is generated across the first winding N1 of the transformer Tr1. In a period in which the switching elements Q6 and Q7 are both in ON states and the switching elements Q5 and Q8 are both in OFF states, a voltage Vn2 of −320V is applied across the second winding N2 of the transformer Tr1. In this period, a stepped down voltage Vn1 of −240V in accordance with the ratio in the number of turns of the transformer Tr1 is generated across the first winding N1 of the transformer Tr1. That is, a voltage of which peak voltage is 240V, having a shape of a substantially trapezoidal shape and a voltage of which peak voltage is −240V, having a shape of a substantially trapezoidal shape are alternately generated across the first winding N1.

The controller 15 keeps the switching elements Q1 to Q4 and the switching elements Q11 and Q12 in OFF states, and thus the resultant voltage Vn1 is full-wave rectified by the diodes D1 to D4. The resultant full-wave rectified voltage by the diodes D1 to D4 is applied across both ends of the series circuit of the capacitors C1 and C2, and then is smoothed. The voltage across both ends of the series circuit of the capacitors C1 and C2 as a voltage V1 shown in FIG. 3G is output through the terminals T11 and T12. Note that, the switching elements Q1 to Q4 may perform a full-wave rectification operation in accordance with a synchronous rectification operating together with ON/OFF operations of the switching elements Q5 to Q8.

Hereinafter, a period during which the switching elements Q5 and Q8 are in the ON states and also the switching elements Q6 and Q7 are in the OFF states is referred to as a period T1. Also, a period during which the switching elements Q6 and Q7 are in the ON states and also the switching elements Q5 and Q8 are in the OFF states is referred to as a period T2. These two periods T1 and T2 correspond to supply periods of energy from the second winding N2 to the first winding N1. Periods other than the two periods T1 and T2 (periods T3 and T4 in FIG. 3) correspond to stop periods of energy from the second winding N2 to the first winding N1. The controller 15 controls the voltage V1 which is output through the terminals T11 and T12 by adjusting a ratio of the supply periods of energy [T1+T2] and the stop periods of energy [T3+T4]. Specifically, the controller 15 performs a phase shift operation of changing a phase when the states of the switching elements Q5 and Q6 are inverted and a phase when the states of the switching elements Q7 and Q8 are inverted, for adjusting the ratio of the supply periods of energy and the stop periods of energy.

According to the present embodiment, in a case where a phase difference between an ON period of the switching element Q5 and an ON period of the switching element Q8 is 0 degree and also a phase difference between an ON period of the switching element Q6 and an ON period of the switching element Q7 is 0 degree, a voltage V1 of DC240V is output through the terminals T11 and T12. In a case where the phase difference between the ON period of the switching element Q5 and the ON period of the switching element Q8 is 180 degrees and also the phase difference between the ON period of the switching element Q6 and the ON period of the switching element Q7 is 180 degrees, a voltage V1 output through the terminals T11 and T12 is approximately 0V. The controller 15 controls ON/OFF states of the switching elements Q5 to Q8 so that the voltage V1 which is output through the terminals T11 and T12 equals to DC150V.

Next explained is an operation for discharging the vehicle storage battery 4 in a case where the discharge voltage of the vehicle storage battery 4 is DC 150V, with reference to waveform diagrams in FIGS. 4A to 4G. The bidirectional DC/DC converter 1 boosts (steps up) a voltage V1 across the terminals T11 and T12 of DC150V (an input voltage) to a voltage V2 across the terminals T21 and T22 of DC320V (an output voltage).

In the discharging operation of the vehicle storage battery 4 with a discharge voltage of DC 150V, as shown in FIGS. 4A to 4D, the controller 15 controls the switching operations of the switching elements Q1 to Q4 to perform a full bridge operation. In the full bridge operation of the switching circuit 11, the switching elements Q11 and Q12 are maintained in OFF states by the controller 15.

Duty cycles of the switching elements Q1 and Q2 are controlled to be approximately 50%, and ON/OFF states of the switching elements Q1 and Q2 are mutually inverted. That is, while the switching element Q1 is in an ON state, the switching element Q2 is in an OFF state. Also, while the switching element Q1 is in an OFF state, the switching element Q2 is in an ON state. A dead time in which the switching elements Q1 and Q2 are both in OFF states is provided when the ON/OFF states of the switching elements Q1 and Q2 are mutually inverted (not shown in FIGS. 4A and 4B).

Duty cycles of the switching elements Q3 and Q4 are controlled to be approximately 50%, and ON/OFF states of the switching elements Q3 and Q4 are mutually inverted. That is, while the switching element Q3 is in an ON state, the switching element Q4 is in an OFF state. Also, while the switching element Q3 is in an OFF state, the switching element Q4 is in an ON state. A dead time in which the switching elements Q3 and Q4 are both in OFF states is provided when the ON/OFF states of the switching elements Q3 and Q4 are mutually inverted (not shown in FIGS. 4C and 4D).

FIG. 4E shows the waveform of the voltage Vn1 of the first winding N1 of the transformer Tr1, and FIG. 4F shows the waveform of the voltage Vn2 of the second winding N2 of the transformer Tr1. In a period in which the switching elements Q1 and Q4 are both in ON states and the switching elements Q2 and Q3 are both in OFF states, a voltage Vn1 of 150V is applied across the first winding N1 of the transformer Tr1. In this period, a stepped up voltage Vn2 of 200V in accordance with the ratio in the number of turns of the transformer Tr1 is generated across the second winding N2 of the transformer Tr1. In a period in which the switching elements Q2 and Q3 are both in ON states and the switching elements Q1 and Q4 are both in OFF states, a voltage Vn1 of −150V is applied across the first winding N1 of the transformer Tr1. In this period, a stepped up voltage Vn2 of −200V in accordance with the ratio in the number of turns of the transformer Tr1 is generated across the second winding N2 of the transformer Tr1. That is, a voltage of which peak voltage is 200V, having a shape of a substantially trapezoidal shape and a voltage of which peak voltage is −200V, having a shape of a substantially trapezoidal shape are alternately generated across the second winding N2.

The controller 15 keeps the switching elements Q5 to Q8 in OFF states and also keeps the switching elements Q13 and Q14 in ON states. As a result, a full-wave voltage doubling rectification is performed in which a period when a voltage across the second winding N2 is applied to the capacitor C3 through the inductor L1 and a period when the voltage across the second winding N2 is applied to the capacitor C4 through the inductor L1 alternate every half cycle, and then the resultant voltage is smoothed by the capacitors C3 and C4. The voltage across both ends of the series circuit of the capacitors C3 and C4 as a voltage V2 shown in FIG. 4G is output through the terminals T21 and T22.

Hereinafter, a period during which the switching elements Q1 and Q4 are in the ON states and also the switching elements Q2 and Q3 are in the OFF states is referred to as a period T11. Also, a period during which the switching elements Q2 and Q3 are in the ON states and also the switching elements Q1 and Q4 are in the OFF states is referred to as a period T12. These two periods T11 and T12 corresponds to supply periods of energy from the first winding N1 to the second winding N2. The voltage Vn2 is applied to the capacitor C3 during the period T11 and is applied to the capacitor C4 during the period T12. Periods other than the two periods T11 and T12 (periods T13 and T14 in FIG. 4) corresponds to stop periods of energy from the first winding N1 to the second winding N2. The controller 15 controls the voltage V2 which is output through the terminals T21 and T22 by adjusting a ratio of the supply periods of energy [T11+T12] and the stop periods of energy [T13+T14]. Specifically, the controller 15 performs a phase shift operation of changing a phase when the states of the switching elements Q1 and Q2 are inverted and a phase when the states of the switching elements Q3 and Q4 are inverted, for adjusting the ratio of the supply periods of energy and the stop periods of energy.

According to the present embodiment, in a case where a phase difference between an ON period of the switching element Q1 and an ON period of the switching element Q4 is 0 degree and also a phase difference between an ON period of the switching element Q2 and an ON period of the switching element Q3 is 0 degree, a voltage V2 of DC400V is output through the terminals T21 and T22. In a case where the phase difference between the ON period of the switching element Q1 and the ON period of the switching element Q4 is 180 degrees and also the phase difference between the ON period of the switching element Q2 and the ON period of the switching element Q3 is 180 degrees, a voltage V2 which is output through the terminals T21 and T22 is approximately 0V. The controller 15 controls ON/OFF states of the switching elements Q1 to Q4 so that the voltage V2 which is output through the terminals T21 and T22 equals to DC320V (the capacitor C3: DC160V, the capacitor C4: DC160V).

Next explained is an operation for charging a vehicle storage battery 4 in a case where the charge voltage of the vehicle storage battery 4 is DC450V. The bidirectional DC/DC converter 1 steps up a voltage V2 across the terminals T21 and T22 of DC320V (an input voltage) to a voltage V1 across the terminals T11 and T12 of DC450V (an output voltage).

In the charging operation of the vehicle storage battery 4 with a charge voltage of DC450V, the controller 15 controls the switching elements Q5 to Q8 to perform a full bridge operation (refer to FIGS. 3A to 3D). In the full bridge operation of the switching circuit 12, the switching elements Q13 and Q14 are maintained in OFF states by the controller 15.

In a period in which the switching elements Q5 and Q8 are both in the ON states and the switching elements Q6 and Q7 are both in the OFF states, a voltage Vn2 of 320V is applied across the second winding N2 of the transformer Tr1. In this period, a stepped down voltage Vn1 of 240V in accordance with the ratio in the number of turns of the transformer Tr1 is generated across the first winding N1 of the transformer Tr1. In a period in which the switching elements Q6 and Q7 are both in the ON states and the switching elements Q5 and Q8 are both in the OFF states, a voltage Vn2 of −320V is applied across the second winding N2 of the transformer Tr1. In this period, a stepped down voltage Vn1 of −240V in accordance with the ratio in the number of turns of the transformer Tr1 is generated across the first winding N1 of the transformer Tr1. That is, a voltage of which peak voltage is 240V, having a shape of a substantially trapezoidal shape and a voltage of which peak voltage is −240V, having a shape of a substantially trapezoidal shape are alternately generated across the first winding N1 (refer to FIGS. 3E and 3F).

The controller 15 keeps the switching elements Q1 to Q4 in the OFF states and keeps the switching elements Q11 and Q12 in the ON states. As a result, a full-wave voltage doubling rectification is performed in which a period when a voltage across the first winding N1 is applied to the capacitor C1 and a period when the voltage across the first winding N1 is applied to the capacitor C2 alternate every half cycle, and then the resultant voltage is smoothed by the capacitors C1 and C2. The voltage across both ends of the series circuit of the capacitors C1 and C2 as a voltage V1 is output through the terminals T11 and T12.

The controller 15 controls the ON/OFF states of the switching elements Q5 to Q8 so that the voltage V1 which is output through the terminals T11 and T12 equals to DC450V (the capacitor C1: DC225V, the capacitor C2: DC225V). Specifically, the controller 15 performs the phase shift operation of changing a phase when the states of the switching elements Q5 and Q6 are inverted and a phase when the states of the switching elements Q7 and Q8 are inverted, for adjusting the ratio of the supply periods of energy and the stop periods of energy.

Next explained is an operation for discharging the vehicle storage battery 4 in a case where the discharge voltage of the vehicle storage battery 4 is DC450V. The bidirectional DC/DC converter 1 steps down a voltage V1 across the terminals T11 and T12 of DC450V (an input voltage) to a voltage V2 across the terminals T21 and T22 of DC320V (an output voltage).

In the discharging operation of the vehicle storage battery 4 with the discharge voltage of DC450V, the controller 15 controls the switching elements Q1 to Q4 to perform a full bridge operation (refer to FIGS. 4A to 4D). In the full bridge operation of the switching circuit 11, the switching elements Q11 and Q12 are maintained in the OFF states by the controller 15.

In a period in which the switching elements Q1 and Q4 are both in the ON states and the switching elements Q2 and Q3 are both in the OFF states, a voltage Vn1 of 450V is applied across the first winding N1 of the transformer Tr1. In this period, a stepped up voltage Vn2 of 600V in accordance with the ratio in the number of turns of the transformer Tr1 is generated across the second winding N2 of the transformer Tr1. In a period in which the switching elements Q2 and Q3 are both in the ON states and the switching elements Q1 and Q4 are both in the OFF states, a voltage Vn1 of −450V is applied across the first winding N1 of the transformer Tr1. In this period, a stepped up voltage Vn2 of −600V in accordance with the ratio in the number of turns of the transformer Tr1 is generated across the second winding N2 of the transformer Tr1. That is, a voltage of which peak voltage is 600V, having a shape of a substantially trapezoidal shape and a voltage of which peak voltage is −600V, having a shape of a substantially trapezoidal shape are alternately generated across the second winding N2.

The controller 15 keeps the switching elements Q5 to Q8 and the switching elements Q13 and Q14 in the OFF states, and thus the resultant voltage Vn2 is full-wave rectified by the diodes D5 to D8. The resultant full-wave rectified voltage by the diodes D5 to D8 is applied across the both ends of the series circuit of the capacitors C3 and C4, and then is smoothed. The voltage across the both ends of the series circuit of the capacitors C3 and C4 as a voltage V2 is output through the terminals T21 and T22. Note that, the switching elements Q5 to Q8 may be controlled to perform a full-wave rectification operation in accordance with a synchronous rectification of operating together with ON/OFF operations of the switching elements Q1 to Q4.

The controller 15 controls the ON/OFF states of the switching elements Q1 to Q4 so that the voltage V2 which is output through the terminals T21 and T22 equals to DC320V. Specifically, the controller 15 performs the phase shift operation of changing a phase when the states of the switching elements Q1 and Q2 are inverted and a phase when the states of the switching elements Q3 and Q4 are inverted, for adjusting the ratio of the supply periods of energy and the stop periods of energy.

As described above, the controller 15 switches the operation between the full-wave rectification operation and the full-wave voltage doubling rectification operation on the basis of magnitude relationship between the DC voltage across the terminals T11 and T12 and the DC voltage across the terminals T21 and T22. Accordingly, the bidirectional DC/DC converter 1 has wider available ranges of an input voltage and an output voltage. As a result, it is possible to perform the boost and step down operations bidirectionally within the widened ranges of the input voltage and the output voltage.

The controller 15 may be configured to switch operations of the switching circuits 11 and 12 between a full bridge operation and a half bridge operation on the basis of magnitude relationship between the DC voltage across the terminals T11 and T12 and the DC voltage across the terminals T21 and T22. In this case, the ranges of the input voltage and the output voltage of the bidirectional DC/DC converter 1 can be further widened.

For example, in a case where the discharge voltage of the vehicle storage battery 4 is DC450V, the bidirectional DC/DC converter 1 may step down a voltage V1 across the terminals T11 and T12 of DC450V (the input voltage) to a voltage V2 across the terminals T21 and T22 of DC320V (the output voltage).

In the discharging operation of the vehicle storage battery 4 with a discharge voltage of DC450V, the controller 15 keeps the switching elements Q3 and Q4 in the OFF states and keeps the switching elements Q11 and Q12 in the ON states. The controller 15 controls the duty cycle of the switching element Q1 to equal to or less than 50%, and controls the duty cycle of the switching element Q2 to a value same as that of the switching element Q1. Also, the controller 15 controls the switching operation of the switching elements Q1 and Q2 so that a phase of an ON state of the switching element Q1 and a phase of an ON state of the switching element Q2 differ from each other by 180 degrees. That is, the controller 15 controls the switching circuit 11 in accordance with a half bridge operation.

In a period in which the switching element Q1 is in the ON state and the switching element Q2 is in the OFF state, a voltage Vn1 of 225V (a half of 450V) is applied across the first winding N1 of the transformer Tr1. In this period, a stepped up voltage Vn2 of 300V in accordance with the ratio in the number of turns of the transformer Tr1 is generated across the second winding N2 of the transformer Tr1. In a period in which the switching element Q2 is in the ON state and the switching element Q1 is in the OFF state, a voltage Vn1 of −225V is applied across the first winding N1 of the transformer Tr1. In this period, a stepped up voltage Vn2 of −300V in accordance with the ratio in the number of turns of the transformer Tr1 is generated across the second winding N2 of the transformer Tr1. That is, a voltage of which peak voltage is 300V, having a shape of a substantially trapezoidal shape and a voltage of which peak voltage is −300V, having a shape of a substantially trapezoidal shape are alternately generated across the second winding N2.

The controller 15 keeps the switching elements Q5 to Q8 in the OFF states and keeps the switching elements Q13 and Q14 in the ON states. As a result, the full-wave voltage doubling rectification is performed in which a period when a voltage across the second winding N2 is applied to the capacitor C3 and a period when the voltage across the second winding N2 is applied to the capacitor C4 alternate every half cycle, and then the resultant voltage is smoothed by the capacitors C3 and C4. The voltage across the both ends of the series circuit of the capacitors C3 and C4 as the voltage V1 is output through the terminals T11 and T12. Note that, the switching elements Q5 and Q6 may be controlled to perform a synchronous rectification by operating together with ON/OFF operations of the switching elements Q1 and Q2.

The controller 15 controls ON/OFF states of the switching elements Q1 and Q2 so that the voltage V2 which is output through the terminals T21 and T22 equals to DC320V (the capacitor C3: DC160V, the capacitor C4: DC160V). Specifically, the controller 15 controls the duty cycle of the switching elements Q1 and Q2 for adjusting the ratio of the supply periods of energy and the stop periods of energy.

Also, in the charging operation of the vehicle storage battery 4, the controller 15 may switch an operation of the switching circuit 12 between a full bridge operation and a half bridge operation on the basis of magnitude relationship between the DC voltage across the terminals T11 and T12 and the DC voltage across the terminals T21 and T22.

The present invention has been described with reference to certain preferred embodiments. However, the invention is not limited to the embodiments, and numerous modifications and variations can be made without departing from the true spirit and scope of this invention.

(Summary)

The bidirectional DC/DC converter 1 described above is configured to perform bidirectional voltage conversion in which an operation is switched between a first operation and a second operation. The first operation is the operation of outputting a DC voltage (a second DC voltage) resulting from DC/DC conversion of a DC voltage (a first DC voltage) received through first terminals (terminals T11 and T12), through second terminals (terminals T21 and T22). The second operation is the operation of outputting a DC voltage (a fourth DC voltage) resulting from DC/DC conversion of a DC voltage (a third DC voltage) received through the second terminals, through the first terminals. The bidirectional DC/DC converter 1 includes a first switching circuit 11. The first switching circuit 11 is constituted by a series circuit of a first switching element Q1 and a second switching element Q2 connected between the first terminals and a series circuit of a third switching element Q3 and a fourth switching element Q4 connected between the first terminals. The bidirectional DC/DC converter 1 further includes a first winding N1 of a transformer Tr1 connected between a connection point of the first switching element Q1 and the second switching element Q2 and a connection point of the third switching element Q3 and the fourth switching element Q4. The bidirectional DC/DC converter 1 further includes a second switching circuit 12. The second switching circuit 12 is constituted by a series circuit of a fifth switching element Q5 and a sixth switching element Q6 connected between the second terminals and a series circuit of a seventh switching element Q7 and an eighth switching element Q8 connected between the second terminals. The bidirectional DC/DC converter 1 further includes a second winding N2 of the transformer Tr1 connected between a connection point of the fifth switching element Q5 and the sixth switching element Q6 and a connection point of the seventh switching element Q7 and the eighth switching element Q8. The bidirectional DC/DC converter 1 further includes first to eighth rectifying elements D1 to D8 that are respectively connected in parallel to the first to eighth switching elements Q1 to Q8 so that the first to eighth rectifying elements D1 to D8 are reversely biased when receiving an input DC voltage. The bidirectional DC/DC converter 1 further includes a series circuit of a first capacitor C1 and a second capacitor C2 connected between the first terminals, and a series circuit of a third capacitor C3 and a fourth capacitor C4 connected between the second terminals. The bidirectional DC/DC converter 1 further includes a first short circuit 13 having a closed state of making electrical conduction between the connection point of the third switching element Q3 and the fourth switching element Q4 and a connection point of the first capacitor C1 and the second capacitor C2 and an open state of breaking the electrical conduction between the connection point of the third switching element Q3 and the fourth switching element Q4 and the connection point of the first capacitor C1 and the second capacitor C2. The bidirectional DC/DC converter 1 further includes a second short circuit 14 having a closed state of making electrical conduction between the connection point of the seventh switching element Q7 and the eighth switching element Q8 and a connection point of the third capacitor C3 and the fourth capacitor C4 and an open state of breaking the electrical conduction between the connection point of the seventh switching element Q7 and the eighth switching element Q8 and the connection point of the third capacitor C3 and the fourth capacitor C4. The bidirectional DC/DC converter 1 further includes a controller 15 configured to perform drive controls of the first to eighth switching elements Q1 to Q8 and open/close controls of the first short circuit 13 and the second short circuit 14.

The controller 15 is configured, in the first operation, to switch an operation between a full-wave rectification operation and a full-wave voltage doubling rectification operation on a basis of magnitude relationship between the DC voltage (the first DC voltage) received through the first terminals and the DC voltage (the second DC voltage) output through the second terminals. The full-wave rectification operation in the first operation is the operation of applying a full-wave rectification voltage, resulting from full-wave rectification of a voltage across the second winding N2, to the series circuit of the third capacitor C3 and the fourth capacitor C4 while maintaining the second short circuit 14 in the open state. The full-wave voltage doubling rectification operation in the first operation is the operation of applying a voltage across the second winding N2 alternately to the third capacitor C3 and the fourth capacitor C4 while maintaining the second short circuit 14 in the closed state.

Further, the controller 15 is configured, in the second operation, to switch an operation between a full-wave rectification operation and a full-wave voltage doubling rectification operation on a basis of magnitude relationship between the DC voltage (the fourth DC voltage) output through the first terminals and the DC voltage (the third DC voltage) received through the second terminals. The full-wave rectification operation in the second operation is the operation of applying a full-wave rectification voltage, resulting from full-wave rectification of a voltage across the first winding N1, to the series circuit of the first capacitor C1 and the second capacitor C2 while maintaining the first short circuit 13 in the open state. The full-wave voltage doubling rectification operation in the second operation is the operation of applying a voltage across the first winding N1 alternately to the first capacitor C1 and the second capacitor C2 while maintaining the first short circuit 13 in the closed state.

According to the configuration, the bidirectional DC/DC converter 1 according to an aspect of the present invention switches the operation between the full-wave rectification operation and the full-wave voltage doubling rectification operation on the basis of magnitude relationship between the DC voltage (the first or fourth DC voltage) across the first terminals and the DC voltage (the second or third DC voltage) across the second terminals. Accordingly, the bidirectional DC/DC converter has wider available ranges of an input voltage and an output voltage. As a result, it is possible to perform the boost and step down operations bidirectionally within the widened ranges of the input voltage and the output voltage.

Preferably, the controller 15 is configured, in the first operation, to switch, on a basis of magnitude relationship between the DC voltage (the first DC voltage) of the first terminals and the DC voltage (the second DC voltage) of the second terminals, an operation between a full bridge operation and a half bridge operation. The full bridge operation for switching control is performed as follows while maintaining the first short circuit 13 in the open state. The full bridge operation includes switching controls of: the first switching element Q1 and the second switching element Q2 so that ON/OFF states of the first switching element Q1 and the second switching element Q2 are mutually inverted; and further the third switching element Q3 and the fourth switching element Q4 so that ON/OFF states of the third switching element Q3 and the fourth switching element Q4 are mutually inverted. The half bridge operation is performed as follows while maintaining the first short circuit 13 in the closed state. The half bridge operation includes: setting a duty cycle of the first switching element Q1 to equal to or less than 50%; setting a duty cycle of the second switching element Q2 to a value same as that of the first switching element Q1; controlling switching of the first switching element Q1 and the second switching element Q2 so that a phase difference between an ON state of the first switching element Q1 and an ON state of the second switching element Q2 is 180 degrees; and maintaining the third switching element Q3 and the fourth switching element Q4 in OFF states.

According to the configuration, in the first operation, the bidirectional DC/DC converter 1 switches, on the basis of magnitude relationship between the DC voltage (the first DC voltage) of the first terminals and the DC voltage (the second DC voltage) of the second terminals, the operation between the full bridge operation and the half bridge operation. Accordingly, both ranges of the input voltage and the output voltage of the bidirectional DC/DC converter 1 can be further widened.

Preferably, the controller 15 is configured, in the second operation, to switch, on a basis of magnitude relationship between the DC voltage (the fourth DC voltage) of the first terminals and the DC voltage (the third DC voltage) of the second terminals, an operation between a full bridge operation and a half bridge operation. The full bridge operation for switching control is performed as follows while maintaining the second short circuit 14 in the open state. The full bridge operation includes switching controls of: the fifth switching element Q5 and the sixth switching element Q6 so that ON/OFF states of the fifth switching element Q5 and the sixth switching element Q6 are mutually inverted; and further the seventh switching element Q7 and the eighth switching element Q8 so that ON/OFF states of the seventh switching element Q7 and the eighth switching element Q8 are mutually inverted. The half bridge operation is performed as follows while maintaining the second short circuit 14 in the closed state. The half bridge operation includes: setting a duty cycle of the fifth switching element Q5 to equal to or less than 50%; setting a duty cycle of the sixth switching element Q6 to a value same as that of the fifth switching element Q5; controlling switching of the fifth switching element Q5 and the sixth switching element Q6 so that a phase difference between an ON state of the fifth switching element Q5 and an ON state of the sixth switching element Q6 is 180 degrees; and maintaining the seventh switching element Q7 and the eighth switching element Q8 in OFF states.

According to the configuration, in the second operation, the bidirectional DC/DC converter 1 switches, on the basis of magnitude relationship between the DC voltage (the fourth DC voltage) of the first terminals and the DC voltage (the third DC voltage) of the second terminals, the operation between the full bridge operation and the half bridge operation. Accordingly, both ranges of the input voltage and the output voltage of the bidirectional DC/DC converter 1 can be further widened.

A bidirectional power converter includes the bidirectional DC/DC converter 1 according to an aspect of the present invention and a bidirectional inverter 2. The bidirectional DC/DC converter 1 performs bidirectional voltage conversion in which the operation is switched between the first operation and the second operation. The first operation is for outputting the DC voltage (the second DC voltage) resulting from DC/DC conversion of the DC voltage (the first DC voltage) received through the first terminals (the terminals T11 and T12), through the second terminals (the terminals T21 and T22). The second operation is for outputting the DC voltage (the fourth DC voltage) resulting from DC/DC conversion of the DC voltage (the third DC voltage) received through the second terminals, through the first terminals. The bidirectional inverter 2 is configured: to convert the DC voltage (the second DC voltage) across the second terminals into an AC voltage and output the resultant AC voltage in accordance with the first operation; and to convert an AC voltage into the DC voltage (the third DC voltage) to apply the DC voltage (the third DC voltage) between the second terminals in accordance with the second operation.

According to the configuration, the bidirectional power converter according to an aspect of the present invention switches the operation between the full-wave rectification operation and the full-wave voltage doubling rectification operation on the basis of magnitude relationship between the DC voltage (the first or fourth DC voltages) across the first terminals and the DC voltage (the second or third DC voltages) across the second terminals. Accordingly, the bidirectional DC/DC converter 1 has wider available ranges of the input voltage and the output voltage. As a result, it is possible to perform the boost and step down operations bidirectionally within the widened ranges of the input voltage and the output voltage.

The invention claimed is:
1. A bidirectional DC/DC converter configured to perform bidirectional voltage conversion in which an operation is switched between a first operation of outputting a second DC voltage resulting from DC/DC conversion of a first DC voltage received through first terminals, through second terminals, and a second operation of outputting a fourth DC voltage resulting from DC/DC conversion of a third DC voltage received through the second terminals, through the first terminals, the bidirectional DC/DC converter comprising:
a first switching circuit constituted by a series circuit of first and second switching elements connected between the first terminals and a series circuit of third and fourth switching elements connected between the first terminals;
a first winding of a transformer connected between a connection point of the first and second switching elements and a connection point of the third and fourth switching elements;
a second switching circuit constituted by a series circuit of fifth and sixth switching elements connected between the second terminals and a series circuit of seventh and eighth switching elements connected between the second terminals;
a second winding of the transformer connected between a connection point of the fifth and sixth switching elements and a connection point of the seventh and eighth switching elements;
first to eighth rectifying elements that are respectively connected in parallel to the first to eighth switching elements so that the first to eighth rectifying elements are reversely biased when receiving an input DC voltage;
a series circuit of first and second capacitors connected between the first terminals;
a series circuit of third and fourth capacitors connected between the second terminals;
a first short circuit having a closed state of making electrical conduction between the connection point of the third and fourth switching elements and a connection point of the first and second capacitors and an open state of breaking the electrical conduction between the connection point of the third and fourth switching elements and the connection point of the first and second capacitors;
a second short circuit having a closed state of making electrical conduction between the connection point of the seventh and eighth switching elements and a connection point of the third and fourth capacitors and an open state of breaking the electrical conduction between the connection point of the seventh and eighth switching elements and the connection point of the third and fourth capacitors; and
a controller configured to perform drive controls of the first to eighth switching elements and open/close controls of the first and second short circuits,
the controller being configured:
in the first operation, to switch an operation between a full-wave rectification operation of applying a full-wave rectification voltage, resulting from full-wave rectification of a voltage across the second winding, to the series circuit of the third and fourth capacitors while maintaining the second short circuit in the open state, and a full-wave voltage doubling rectification operation of applying a voltage across the second winding alternately to the third capacitor and the fourth capacitor while maintaining the second short circuit in the closed state, on a basis of magnitude relationship between the first DC voltage received through the first terminals and the second DC voltage output through the second terminals; and in the second operation, to switch an operation between a full-wave rectification operation of applying a full-wave rectification voltage, resulting from full-wave rectification of a voltage across the first winding, to the series circuit of the first and second capacitors while maintaining the first short circuit in the open state, and a full-wave voltage doubling rectification operation of applying a voltage across the first winding alternately to the first capacitor and the second capacitor while maintaining the first short circuit in the closed state, on a basis of magnitude relationship between the fourth DC voltage output through the first terminals and the third DC voltage received through the second terminals.

2. The bidirectional DC/DC converter according to claim 1, wherein the controller is configured, in the first operation, to switch, on a basis of magnitude relationship between the first DC voltage of the first terminals and the second DC voltage of the second terminals, an operation between a full bridge operation for switching control of: the first and second switching elements so that ON/OFF states of the first and second switching elements are mutually inverted; and the third and fourth switching elements so that ON/OFF states of the third and fourth switching elements are mutually inverted, while maintaining the first short circuit in the open state, and a half bridge operation comprising: setting a duty cycle of the first switching element to equal to or less than 50%; setting a duty cycle of the second switching element to a value same as that of the first switching element; controlling switching of the first and second switching elements so that a phase difference between an ON state of the first switching element and an ON state of the second switching element is 180 degrees; and maintaining the third and fourth switching elements in OFF states, while maintaining the first short circuit in the closed state.

3. The bidirectional DC/DC converter according to claim 1, wherein the controller is configured, in the second operation, to switch, on a basis of magnitude relationship between the fourth DC voltage of the first terminals and the third DC voltage of the second terminals, an operation between a full bridge operation for switching control of: the fifth and sixth switching elements so that ON/OFF states of the fifth and sixth switching elements are mutually inverted; and the seventh and eighth switching elements so that ON/OFF states of the seventh and eighth switching elements are mutually inverted, while maintaining the second short circuit in the open state, and a half bridge operation comprising: setting a duty cycle of the fifth switching element to equal to or less than 50%; setting a duty cycle of the sixth switching element to a value same as that of the fifth switching element; controlling switching of the fifth and sixth switching elements so that a phase difference between an ON state of the fifth switching element and an ON state of the sixth switching element is 180 degrees;

and maintaining the seventh and eighth switching elements in OFF states, while maintaining the second short circuit in the closed state.

4. A bidirectional power converter comprising:

the bidirectional DC/DC converter according to claim 1 configured to perform bidirectional voltage conversion in which the operation is switched between the first operation of outputting the second DC voltage resulting from DC/DC conversion of the first DC voltage received through the first terminals, through the second terminals, and the second operation of outputting the fourth DC voltage resulting from DC/DC conversion of the third DC voltage received through the second terminals, through the first terminals; and a bidirectional inverter configured to convert the second DC voltage across the second terminals into an AC voltage and output the resultant AC voltage in accordance with the first operation, and to convert an AC voltage into the third DC voltage to apply the third DC voltage between the second terminals in accordance with the second operation.

* * * * *